US008165408B2

United States Patent
Fukaya et al.

(10) Patent No.: US 8,165,408 B2
(45) Date of Patent: Apr. 24, 2012

(54) IMAGE RECOGNITION APPARATUS UTILIZING PLURALITY OF WEAK CLASSIFIERS FOR EVALUATING SUCCESSIVE SUB-IMAGES EXTRACTED FROM AN INPUT IMAGE

(75) Inventors: Naoki Fukaya, Oobu (JP); Takashi Bando, Nagoya (JP)

(73) Assignee: Denso Corporation, Kariya (JP)

( * ) Notice: Subject to any disclaimer, the term of this patent is extended or adjusted under 35 U.S.C. 154(b) by 558 days.

(21) Appl. No.: 12/455,854

(22) Filed: Jun. 8, 2009

(65) Prior Publication Data

US 2009/0304290 A1 Dec. 10, 2009

(30) Foreign Application Priority Data

Jun. 9, 2008 (JP) ................................. 2008-150679

(51) Int. Cl.
G06K 9/62 (2006.01)

(52) U.S. Cl. .......................... 382/224; 382/155; 382/159

(58) Field of Classification Search .................. 382/103, 382/104, 105, 106, 107, 108, 115, 117, 118, 382/155, 156, 157, 158, 159, 160, 165, 181, 382/190, 192, 217, 218, 219, 220, 224, 225, 382/226, 227, 228
See application file for complete search history.

(56) References Cited

U.S. PATENT DOCUMENTS

| 7,020,337 | B2 | 3/2006 | Viola et al. | |
|---|---|---|---|---|
| 7,031,499 | B2 | 4/2006 | Viola et al. | |
| 7,099,510 | B2 | 8/2006 | Jones et al. | |
| 2004/0052413 | A1* | 3/2004 | Kunii et al. | 382/159 |
| 2006/0147094 | A1* | 7/2006 | Yoo | 382/117 |

FOREIGN PATENT DOCUMENTS

| JP | 2005-284487 | 10/2005 |
|---|---|---|
| JP | 2008-009893 | 1/2008 |

OTHER PUBLICATIONS

H. Masnadi-Shirazi et al, "High Detection-rate Cascades for Real-Time Object Detection"; Computer Vision, 2007; ICCV 2007; IEEE 11th International Conference, Oct. 14-21, 2007; pp. 1-6.

* cited by examiner

*Primary Examiner* — Brian Le
(74) *Attorney, Agent, or Firm* — Harness, Dickey & Pierce, PLC

(57) ABSTRACT

The position of a face image within an input image is detected based on results from applying a plurality of weak classifiers in sequence to each of sub-images extracted from the input image. A decision whether to interrupt the sequence and reject a currently extracted sub-image is made based on the sum of a total of weighted decision values obtained up to the current point in the sequence and a total of potential weighted decision values obtainable from the remaining weak classifiers if the extracted sub-image were a face image.

28 Claims, 9 Drawing Sheets

FIG. 5

| INDEX VALUE | POSITIVE JUDGEMENT PROBABILITY WITH RESPECT TO GENERAL-CLASS IMAGE | POSITIVE JUDGEMENT PROBABILITY WITH RESPECT TO NON-FACE-CLASS IMAGE | POSITIVE JUDGEMENT PROBABILITY WITH RESPECT TO AUXILIARY-CLASS IMAGE (FACE WITH HEAD SCARF) | INDEX VALUE | POSITIVE JUDGEMENT PROBABILITY WITH RESPECT TO GENERAL-CLASS IMAGE | POSITIVE JUDGEMENT PROBABILITY WITH RESPECT TO NON-FACE-CLASS IMAGE | POSITIVE JUDGEMENT PROBABILITY WITH RESPECT TO AUXILIARY-CLASS IMAGE (FACE WITH HEAD SCARF) |
|---|---|---|---|---|---|---|---|
| 1 | 0.99138 | 0.17662 | 0.28889 | 51 | 0.64826 | 0.25801 | 0.71111 |
| 2 | 0.98879 | 0.18874 | 0.71111 | 52 | 0.64569 | 0.23896 | 0.24444 |
| 3 | 0.975 | 0.28571 | 0.77778 | 53 | 0.63362 | 0.099567 | 0.088889 |
| 4 | 0.925 | 0.12814 | 0.8 | 54 | 0.62931 | 0.1013 | 0.26667 |
| 5 | 0.90172 | 0.17662 | 1 | 55 | 0.62586 | 0.35065 | 0.2 |
| 6 | 0.88879 | 0.35844 | 0.86667 | 56 | 0.61983 | 0.27359 | 0.11111 |
| 7 | 0.87155 | 0.29351 | 0.86667 | 57 | 0.6181 | 0.28312 | 0.42222 |
| 8 | 0.86897 | 0.22597 | 0.17778 | 58 | 0.61466 | 0.17403 | 0 |
| 9 | 0.86638 | 0.19221 | 0.8 | 59 | 0.61207 | 0.28745 | 0.51111 |
| 10 | 0.84655 | 0.15758 | 0.84444 | 60 | 0.60172 | 0.30909 | 0.15556 |
| 11 | 0.83103 | 0.25887 | 0.8 | 61 | 0.6 | 0.095238 | 0.82222 |
| 12 | 0.82328 | 0.13593 | 0.73333 | 62 | 0.58621 | 0.24675 | 0.51111 |
| 13 | 0.81897 | 0.18095 | 0.57778 | 63 | 0.58621 | 0.39567 | 0.13333 |
| 14 | 0.80948 | 0.30563 | 0.53333 | 64 | 0.57931 | 0.26667 | 0.57778 |
| 15 | 0.80776 | 0.2303 | 0.75556 | 65 | 0.57328 | 0.34286 | 0.11111 |
| 16 | 0.80172 | 0.24935 | 0.51111 | 66 | 0.57069 | 0.24156 | 0.24444 |
| 17 | 0.79052 | 0.10216 | 0 | 67 | 0.56034 | 0.32641 | 0.93333 |
| 18 | 0.78966 | 0.13766 | 0.82222 | 68 | 0.55948 | 0.40779 | 0.24444 |
| 19 | 0.78448 | 0.28398 | 0.71111 | 69 | 0.55776 | 0.28745 | 0.62222 |
| 20 | 0.77759 | 0.22684 | 0.31111 | 70 | 0.55172 | 0.13333 | 0.64444 |
| 21 | 0.77414 | 0.3039 | 0.71111 | 71 | 0.53621 | 0.23983 | 0.31111 |
| 22 | 0.7681 | 0.31515 | 0.75556 | 72 | 0.5069 | 0.20693 | 0.088889 |
| 23 | 0.74483 | 0.14978 | 0.44444 | 73 | 0.5 | 0.24762 | 0.62222 |
| 24 | 0.7431 | 0.42511 | 0.86667 | 74 | 0.49483 | 0.16537 | 0.55556 |
| 25 | 0.73017 | 0.24675 | 0.044444 | 75 | 0.48621 | 0.32468 | 0.51111 |
| 26 | 0.72931 | 0.28312 | 0.37778 | 76 | 0.48448 | 0.16623 | 0.15556 |
| 27 | 0.72931 | 0.22078 | 0.46667 | 77 | 0.47672 | 0.21558 | 0.93333 |
| 28 | 0.72759 | 0.11429 | 0.8 | 78 | 0.46897 | 0.26926 | 0.57778 |
| 29 | 0.72672 | 0.090909 | 0 | 79 | 0.46121 | 0.37143 | 0.77778 |
| 30 | 0.72586 | 0.1974 | 0.73333 | 80 | 0.4569 | 0.29091 | 0.46667 |
| 31 | 0.72328 | 0.19048 | 0.26667 | 81 | 0.44397 | 0.37403 | 0.53333 |
| 32 | 0.72241 | 0.329 | 0.53333 | 82 | 0.43621 | 0.33939 | 0.22222 |
| 33 | 0.71293 | 0.39221 | 0.044444 | 83 | 0.43534 | 0.40693 | 0.35556 |
| 34 | 0.70948 | 0.14545 | 0.64444 | 84 | 0.42328 | 0.33333 | 0.48889 |
| 35 | 0.70172 | 0.28571 | 0.53333 | 85 | 0.42069 | 0.21991 | 0.11111 |
| 36 | 0.70086 | 0.28918 | 0.33333 | 86 | 0.41121 | 0.329 | 0.55556 |
| 37 | 0.69914 | 0.29697 | 0.42222 | 87 | 0.38966 | 0.19567 | 0.17778 |
| 38 | 0.69914 | 0.29177 | 0 | 88 | 0.3819 | 0.65195 | 0.66667 |
| 39 | 0.69569 | 0.26147 | 0.86667 | 89 | 0.37672 | 0.15498 | 0.68889 |
| 40 | 0.69052 | 0.39307 | 0.62222 | 90 | 0.37328 | 0.55411 | 0.51111 |
| 41 | 0.68707 | 0.32208 | 0.11111 | 91 | 0.37241 | 0.16537 | 0.46667 |
| 42 | 0.68534 | 0.28831 | 0.66667 | 92 | 0.36983 | 0.29957 | 0.62222 |
| 43 | 0.68362 | 0.26061 | 0.55556 | 93 | 0.34741 | 0.16017 | 0.57778 |
| 44 | 0.6819 | 0.29351 | 0.48889 | 94 | 0.33966 | 0.28745 | 0.22222 |
| 45 | 0.68103 | 0.25628 | 0 | 95 | 0.24828 | 0.15584 | 0.88889 |
| 46 | 0.68017 | 0.43117 | 0.51111 | 96 | 0.23362 | 0.21905 | 1 |
| 47 | 0.67845 | 0.12035 | 0.86667 | 97 | 0.22672 | 0.60866 | 0.51111 |
| 48 | 0.67586 | 0.27619 | 0.73333 | 98 | 0.22414 | 0.20779 | 1 |
| 49 | 0.66552 | 0.40868 | 0.22222 | 99 | 0.16983 | 0.21645 | 0.91111 |
| 50 | 0.65431 | 0.12641 | 0.55556 | 100 | 0.15259 | 0.17922 | 0.86667 |

FIG. 7

| WEAK CLASSIFIER INDEX VALUE | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| GENERAL-CLASS MODEL PATTERN | 1 | 1 | 1 | 1 | 1 | 1 | 1 | 1 | 1 | 1 | 1 | 1 | 1 | 1 | 1 |
| No. 1 AUXILIARY-CLASS MODEL PATTERN | 0 | 1 | 1 | 1 | 1 | 1 | 1 | 0 | 1 | 1 | 1 | 1 | 1 | 1 | 1 |

| EXAMPLE OF OUTPUT DECISION PATTERN |
|---|
| 0 | 1 | 1 | 1 | 1 | 1 | 1 | 0 | 1 | 1 | 1 | 1 | 1 | 0 | 1 |

| WEAK CLASSIFIER INDEX VALUE | 16 | 17 | 18 | 19 | 20 | 21 | 22 | 23 | 24 | 25 | 26 | 27 | 28 | 29 | 30 | CONFORMITY FACTOR |
|---|---|---|---|---|---|---|---|---|---|---|---|---|---|---|---|---|
| GENERAL-CLASS MODEL PATTERN | 1 | 1 | 1 | 1 | 1 | 1 | 1 | 1 | 1 | 1 | 1 | 1 | 1 | 1 | 1 | 0.7 |
| No. 1 AUXILIARY-CLASS MODEL PATTERN | 1 | 0 | 1 | 1 | 0 | 1 | 1 | 0 | 1 | 0 | 0 | 0 | 1 | 0 | 1 | 0.93 |

| EXAMPLE OF OUTPUT DECISION PATTERN |
|---|
| 1 | 0 | 1 | 1 | 0 | 1 | 1 | 0 | 1 | 0 | 0 | 1 | 1 | 0 | 1 |

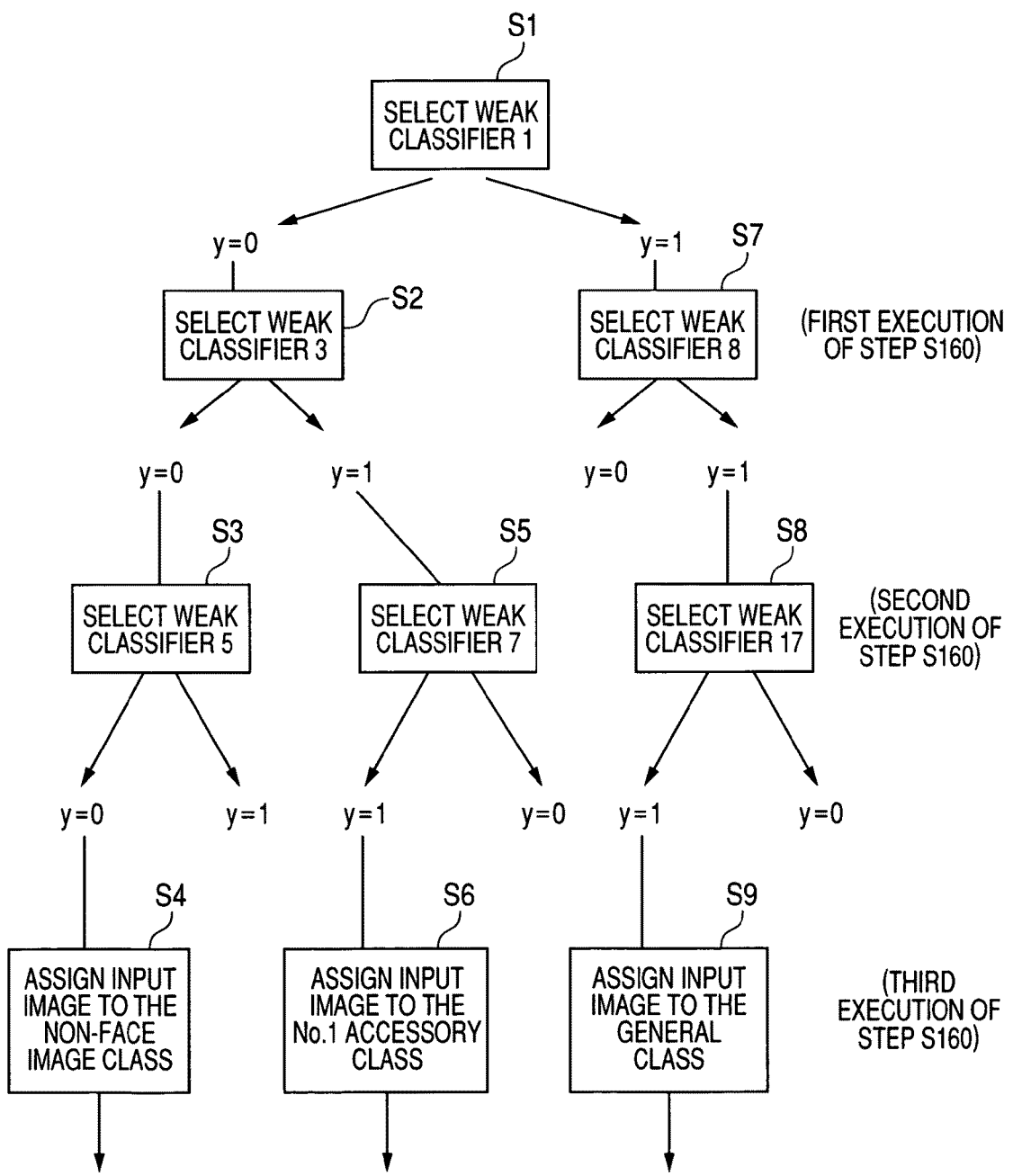

IMAGE RECOGNITION APPARATUS UTILIZING PLURALITY OF WEAK CLASSIFIERS FOR EVALUATING SUCCESSIVE SUB-IMAGES EXTRACTED FROM AN INPUT IMAGE

CROSS-REFERENCE TO RELATED APPLICATIONS

This application is based on and incorporates herein by reference Japanese Patent Application No. 2008-150679 filed on Jun. 9, 2008.

BACKGROUND OF THE INVENTION

1. Field of Application

The present invention relates to an image recognition apparatus for recognizing an object image within an input image, by processing which applies a plurality of weak classifiers.

2. Description of Related Art

Types of driver support system are known which utilize images (expressed as arrays of digitized luminance values) obtained from a camera installed in a vehicle, for monitoring the eyes of the driver while the vehicle is being driven. Such a system can for example generate warning indications to the driver when the driver's eyes attain a condition indicating a lapse of attention, such as eye closing.

With such a driver support system, it is important that the apparatus can extract a face image (i.e., a region containing the eyes, nose and mouth of a person) from within an input image supplied from the camera, and use the face image to rapidly and reliably detect the position of the face within the input image, and thereby enable the condition of the eyes to be monitored. One type of apparatus known for performing such face position detection uses a cascade of mathematical operators known as weak classifiers, for example as described in U.S. Pat. No. 7,099,510 B2, referred to in the following as reference 1. Each weak classifier is trained beforehand by a learning procedure using a number of training images, e.g., using the AdaBoost technique, for detecting a pattern of main features of the recognition-subject image (eyes, nose, mouth, etc., in the case of a face image). With the method described in reference 1 (generally known as the Viola and Jones algorithm), recognition is based on simple rectangular features referred to as "Haar-like" features. A cascade of such weak classifiers is applied to an object image in sequence, to constitute a "strong classifier".

When used in processing for recognition of a face image, such a cascade of weak classifiers is successively applied to a sub-image extracted from an input image by a scanning window. Each weak classifier responds to the object image by producing a 1 or 0 decision value, respectively indicating whether or not recognition of a face image has occurred.

Each decision value is multiplied by a weight that has been established (as a result of the boosting procedure) for the corresponding weak classifier. Basically, the assigned weight values relate to the recognition accuracies, i.e., with weak classifiers having a low accuracy of recognition (but high speed of processing) being assigned relatively low weight values. Each time the object image has been newly evaluated by a weak classifier of the cascade, a judgement is made as to the likelihood that the recognition-subject image has been recognized. The judgement is made based on the weighted decision values obtained up to that point (e.g., by comparing the total of these values with a threshold value). If the likelihood is insufficient, processing of that object image is immediately halted and the results obtained are discarded, and the next sub-image is extracted and similarly processed as an object image.

However with such a type of image recognition apparatus, it may be difficult to reliably perform recognition if there are large variations between instances of a recognition-subject image. For example in the case of face recognition, all face images have a set of main features, i.e., eyes nose, mouth, etc. However in some instances, for example when the face is that of a person wearing a head scarf which partially covers the forehead, or sunglasses covering the eyes, accurate recognition may be difficult. Similarly, recognition may be unreliable if there are large intrinsic differences between features in various instances, e.g., variations in shape of mouth, facial expression, etc. This unreliability results because:

(1) such instances of a face image are likely to be rejected in the early stages of the sequence of applying the weak classifiers, and (2) erroneous recognition may occur due to the fact that, in applying the weak classifiers, no consideration is given to differences in the way in which respective weak classifiers tend to respond to specific accessories such as a face scarf, etc., or to large differences in facial features, i.e., the operation does not take into account the respectively different sensitivities of the weak classifiers to such accessories or to such differences in facial features.

This is a basic problem of the prior art.

In many cases of incorrect rejection, if the processing of the object image had been continued to the later stages of the sequence (where there is a higher accuracy of detecting the main features of a face) it is probable that recognition would have been achieved.

Hence it is a disadvantage of such a prior art type of image recognition apparatus that evaluation of an object image by weak classifiers in sequence is immediately halted if it is judged (based only on results obtained up to that point in the sequence) that the object image is unlikely to correspond to the recognition-subject image, and that respectively different responses of the weak classifiers to specific accessories such as a face scarf, etc., or to large differences in facial features are not take into consideration. Thus, the object image cannot be evaluated by later-stage weak classifiers, even if these may have a higher recognition accuracy than the early-stage weak classifiers. Alternatively, an incorrect sub-image may be assigned a high probability of being a recognition-subject image (by the complete cascade of weak classifiers), due to one or more of the weak classifiers of the cascade having an excessively high sensitivity to some specific feature appearing in that sub-image. For example, such a weak classifier may have an excessive tendency to erroneously recognize the position of the boundary between a head scarf and forehead as the position of the eyes in a face image. As a result, a sub-image which should be rejected at an intermediate stage of the cascade of weak classifiers may in fact reach the final stage of the cascade, and thus be erroneously assigned a high probability of being a recognition-subject image.

For these reasons it is difficult to achieve sufficient generality of recognition, in particular, rendering it difficult to achieve reliable detection of face position within an input image.

In the case of face images that include a specific secondary feature such as a head scarf or sunglasses in addition to the main features (such images being referred to as "accessory-disposed face images" in the following) it might be envisaged that the problem could be overcome by retraining a weak classifier which has excessive sensitivity to such a secondary feature, by using training images which include instances of such accessory-disposed faces. However with such a prior art apparatus in which the weak classifiers are applied in a fixedly predetermined cascade, retraining of any one of the weak classifiers has an effect upon the weak classifiers which are located downstream from it in the cascade sequence. Thus it is not possible to simply perform retraining of a specific weak classifier. Instead, retraining of all of the weak classifiers of the cascade would be necessary.

Thus with the prior art it would be necessary to repeat the training process for all of the weak classifiers, using a large number of training images (for example with approximately 20,000 training images being used in the case of an embodiment described in reference 1). This has the disadvantage of requiring a substantial amount of time and effort.

Moreover if such retraining of all of the weak classifiers were to be performed without special emphasis on recognition of accessory-disposed face images (i.e., without using a large proportion of training images that are instances of an accessory-disposed face) then there could be insufficient reliability of recognizing such images.

On the other hand, if the weak classifiers were to be retrained with particular emphasis given to accessory-disposed face images, then the system might thereby become incapable of reliably recognizing usual face images (without such accessories). There would thus be a danger of decreased generality.

SUMMARY OF THE INVENTION

It is an objective of the present invention to overcome the above problem by providing an image recognition apparatus whereby, even when there is substantial variation of features appearing in various instances of an image that is to be recognized, the apparatus can achieve rapid and reliable recognition.

Specifically, the invention provides an image recognition apparatus for detecting a recognition-subject image such as a face image, within an input image (i.e., an image expressed as digital values of picture elements). The recognition-subject image is characterized by a corresponding pattern of main features, (e.g., forehead, eyes, nose, mouth, in a face image). The apparatus is configured to scan the input image using a scanning window, to extract successive sub-images from the input image. The currently extracted sub-image is processed as an object image, by applying to it a plurality of weak classifiers, to obtain a corresponding value (referred to herein as a recognition judgement value) indicative of the likelihood that the object image corresponds to the recognition-subject image. When all of the input image has been processed, the sub-image having the highest recognition judgement value is taken as corresponding to the recognition-subject image.

When applied to the object image, each weak classifier in turn produces a 1 or 0 decision value in accordance with whether or not recognition is achieved. The decision value is multiplied by a weight (predetermined as corresponding to that weak classifier) to obtain a weighted decision value referred to herein as a "likelihood". The respective values of likelihood obtained for an object image, up to the current point in the sequence, are summed to obtain a cumulative likelihood.

With the present invention, a value referred to herein as a positive judgement expectation value is calculated as the total of respective values of likelihood that would be produced by the pending weak classifiers (those weak classifiers which have not yet been applied in the sequence) if the object image were to correspond to the recognition-subject image. Specifically, that value can be calculated as the total of the respective weights of these pending weak classifiers.

Each time the object image has been processed by a weak classifier, the sum of the positive judgement expectation value and the cumulative likelihood at that point in the sequence is calculated, and if this is less than a predetermined continuation threshold value, processing of the object image is interrupted, and the currently attained cumulative likelihood (or a 0 value) is outputted as the recognition judgement value for the currently extracted sub-image. If processing by all of the weak classifiers has been completed, the final cumulative likelihood is outputted as the recognition judgement value for the currently extracted sub-image. The above processing is then repeated for a succeeding sub-image.

Hence the present invention basically differs from the prior art by utilizing information relating to those weak classifiers which have not yet been applied to the object image (the pending weak classifiers). At each stage in the sequence of processing the object image by successive ones of the weak classifiers (with the weak classifiers not necessarily being applied in a fixedly predetermined order), that information is used in conjunction with results obtained from the weak classifiers which have already been applied to the object image. It has been found that this enables more rapid and reliable recognition of a recognition-subject image when instances of the recognition-subject image have a high degree of variability of image features (e.g., some instances may include extrinsic features such as a head scarf, or may have wide variations in shapes of intrinsic features such as a mouth, etc.), with greater generality being achieved than is possible with prior art methods.

From another aspect, each of the weak classifiers may be tested beforehand, using a plurality of instances of the recognition-subject image as test images, to determine the probability that a decision value of 1 will be obtained from the weak classifier in response to the recognition-subject image. That probability is referred to herein as the positive judgement probability corresponding to the weak classifier concerned.

In that case, the positive judgement expectation value may be obtained by multiplying together the weight and positive judgement probability of each of the aforementioned pending weak classifiers, and obtaining the sum of the resultant products as the positive judgement expectation value.

Some instances of the recognition-subject image may contain a specific secondary feature that is different from the main image features. For example a face image may include a head scarf which modifies the apparent shape of the forehead. From another aspect of the invention (assuming the case in which the recognition-subject image is a face image), an input image containing a face image which does not include such a specific secondary feature is assigned to a class referred to as the general class, while an input image which does include that specific secondary feature is assigned to an auxiliary class. The class assigned to the input image is referred to herein as the object class. For each auxiliary class, a corresponding group of weak classifiers is defined from among the plurality of weak classifiers, i.e., a weak classifier group which has been predetermined as appropriate for recognition of a face image conforming to that auxiliary class.

In addition, for each of the classes, a corresponding pattern (referred to herein as a model pattern) of (1 and 0) values may be derived beforehand and stored in memory. For each class, the corresponding model pattern is a pattern of decision value that can be expected to be obtained from a specific sub-set of the weak classifiers, during the sequential processing of an object image by successive weak classifiers, when the object image is a face image and corresponds to the class concerned. Following commencement of processing an object image by successive weak classifiers, an output pattern of decision values obtained from the specific sub-set of weak classifiers is compared with each of the model patterns, to find the model pattern having closest conformance to the output pattern. The class corresponding to that closest model pattern is then assigned as the object class.

If that corresponding class is different from the previously assigned object class, then processing results obtained for the input image up to that point are discarded, and processing of the input image is restarted from the beginning, based on the newly assigned object class.

By thus applying an appropriate group of weak classifiers for detecting those instances of the recognition-subject image that contain a specific extrinsic feature (e.g., a head scarf) which is different from the main features, it becomes possible to achieve increased accuracy of recognition and greater generality.

In addition, the invention has the following advantage, with respect to auxiliary classes. After training of the weak classifiers has been initially performed (using a large number of training images, e.g., 1200 general-class training images in the case of an example of applying Adaboost training which is described hereinafter), it may be found that accurate recognition cannot be achieved for images which contain some specific feature. For example it may be found that a face image cannot be reliably recognized when the image includes some specific accessory such as a head scarf, or sunglasses, worn by the individual portrayed in the image. It is possible for this to occur even if the weak classifiers have been trained by using training images in which such features appear in some of the training images. However with the present invention, retraining of weak classifiers is not required in such a case. Instead, images containing the specific accessory can be assigned to a corresponding new auxiliary class. Each of the weak classifiers are then evaluated (respectively separately) by being applied to test images which are in accordance with that new auxiliary class, to measure the probability that the weak classifier will generate a positive (i.e., positive recognition) result when applied to such an image. That probability is referred to as the positive judgement probability with respect to the specific new auxiliary class. All or part of those weak classifiers which have a higher positive judgement probability with respect to images in accordance with the new auxiliary class than with respect to general-class are then excluded from the complete set of weak classifiers. The remaining weak classifiers are then assigned as the weak classifier group which is appropriate for recognition of an image conforming to that new auxiliary class.

In that way, the aforementioned groups of weak classifiers that are appropriate for detecting those instances of the recognition-subject image that contain a specific extrinsic feature (e.g., a head scarf) which is different from the main features, can be readily established when the need arises, without requiring retraining of the weak classifiers.

For each of the weak classifiers, a plurality of positive judgement probabilities respectively corresponding to the general class and each of the one or more auxiliary classes are preferably derived beforehand and stored in memory. In that case, each model pattern corresponding to a specific class may be obtained by quantizing (to 1 or 0 values) respective positive judgement probabilities corresponding to that class, for each weak classifier of a specific sub-set of the plurality of weak classifiers. This sub-set may for example consist of weak classifiers which are applied during initial stages of the sequence of applying weak classifiers to the object image, and which are common to each of the weak classifier groups corresponding to the various classes.

BRIEF DESCRIPTION OF THE DRAWINGS

FIG. 5 is a table showing sets of positive judgement probabilities obtained experimentally for a set of weak classifiers, arranged in accordance with respective image classes;

FIG. 7 shows examples of model patterns which are used in performing class judgement;

FIG. 10 is a diagram for use in describing an alternative method of performing class judgement.

DESCRIPTION OF PREFERRED EMBODIMENTS

Figure 1:
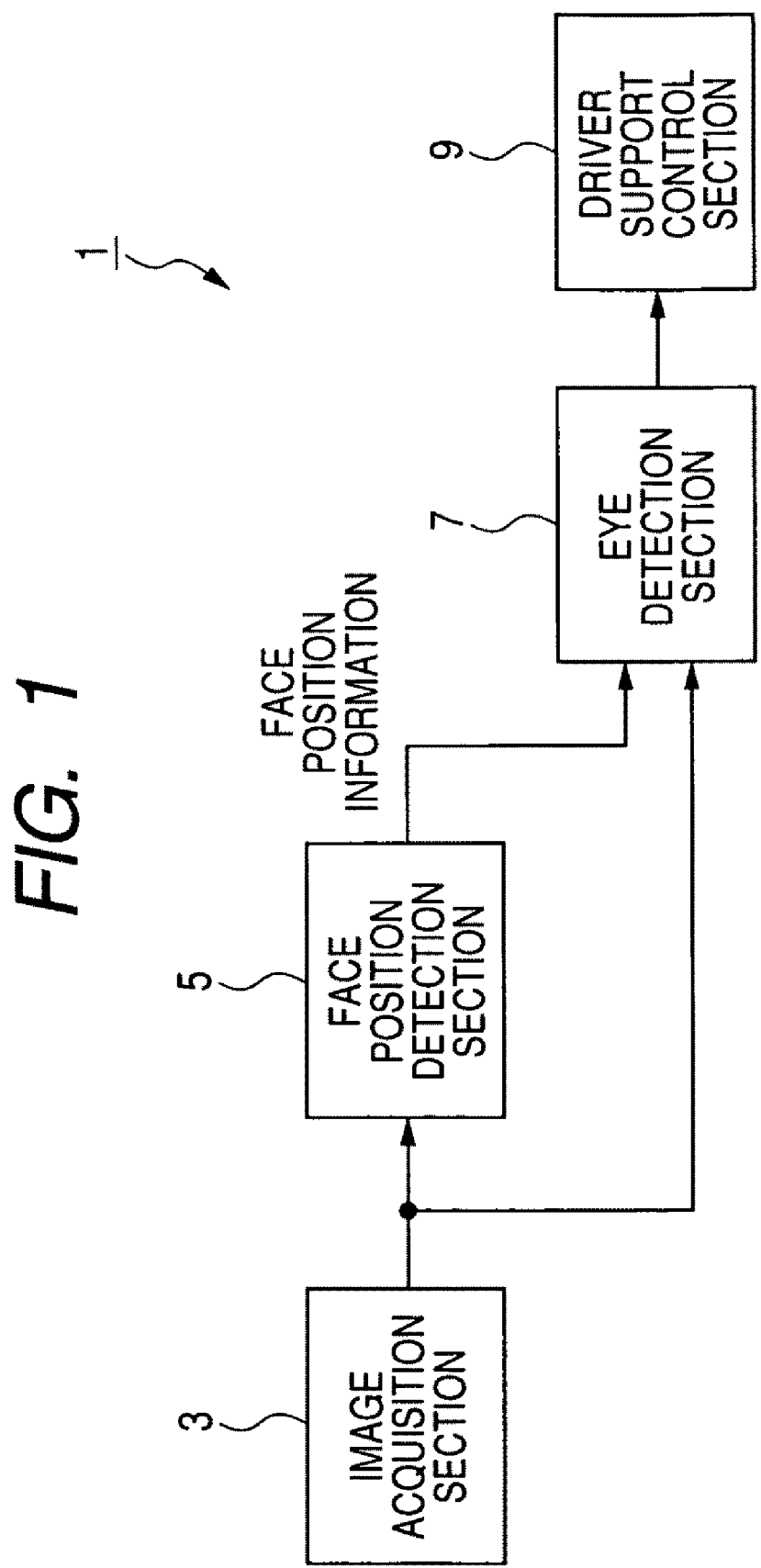
FIG. 1 is a block diagram showing the overall configuration of an embodiment of a driver support system.

FIG. 1 is a general system block diagram of a vehicle-installed driver assistance system 1 which incorporates an embodiment of a face position detection apparatus, designated as face position detection section 5. The driver assistance system 1 also includes an image acquisition section 3 which captures images of a region that includes the head of the driver of the vehicle, and supplies these to the face position detection apparatus 5, for detection of the position of the vehicle driver's face within each input image from the image acquisition section 3. The driver assistance system 1 further includes an eye detection section 7 which detects the driver's eyes, based on an input image supplied from the image acquisition section 3 and face position information that is supplied from the face position detection apparatus 5, while a driver support control section 9 judges whether the driver's eyes appear in a normal or abnormal condition (e.g., are closed), based on detection results supplied from the eye detection section 7, and generates a warning signal when an abnormal condition is detected.

The image acquisition section 3 of this embodiment is based on a CCD (charge-coupled device) type of digital video camera, which acquires successive images containing the face of the vehicle driver, and a LED lamp which illuminates the face. The light is in the near infra-red range, to enable images to be acquired even during night-time operation. The image acquisition section 3 may for example be mounted on the vehicle dashboard, but could equally be located on the instrument panel, or on the steering column, the rear-view mirror, etc. Although a LED lamp is used with this embodiment, it would be equally possible to utilize other types of lamp, or to omit the lamp.

The eye detection section 7 and driver support control section 9 perform known forms of processing, which are not directly related to the principles of the present invention, so that description of these is omitted.

Face Position Detection Section

Figure 2:
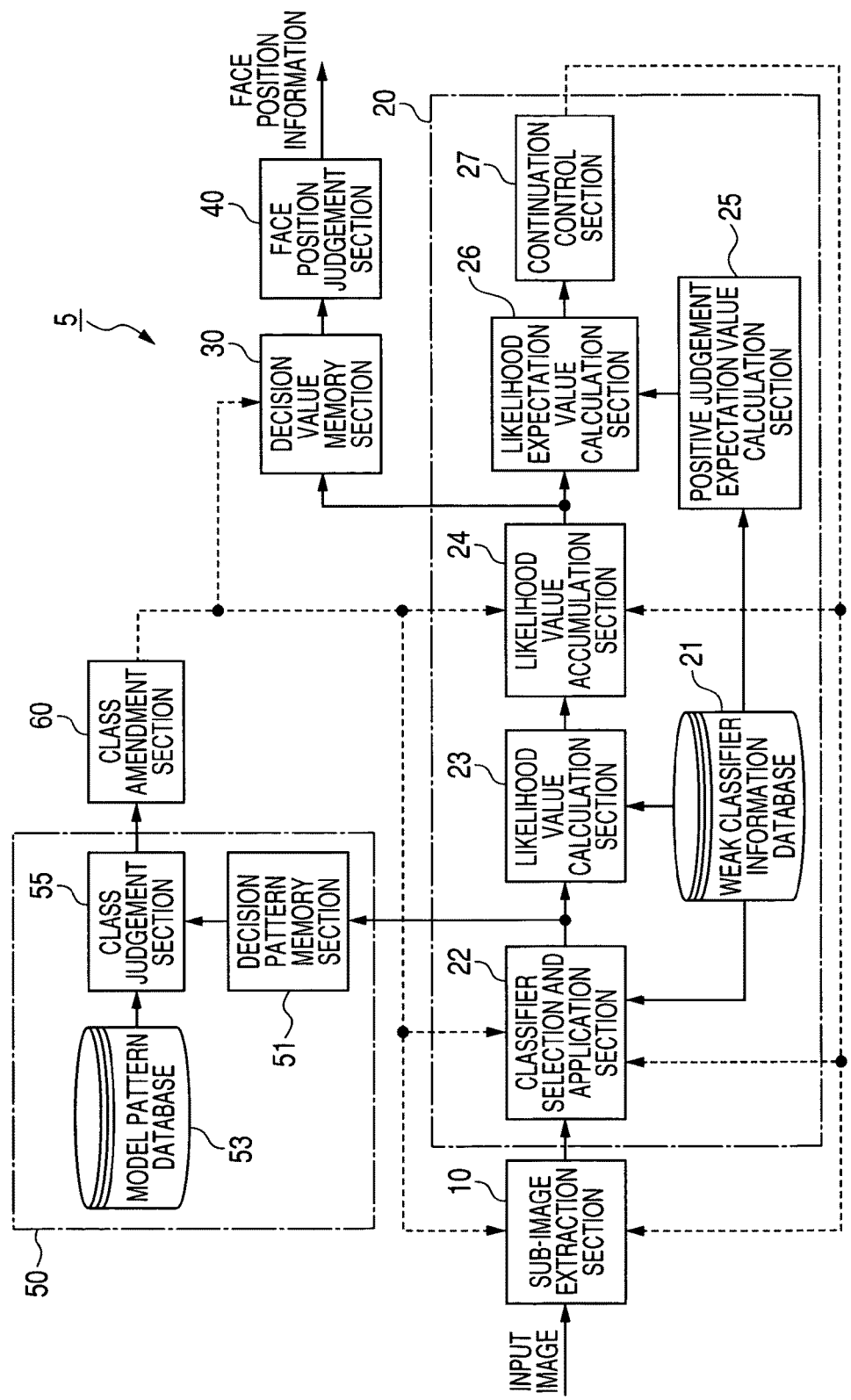
FIG. 2 is a block diagram showing details of a face recognition section of the embodiment.
Figure 9:
FIG. 9 is a corresponding diagram showing results obtained by applying the embodiment of the invention to such a face image.

FIG. 2 is a detailed block diagram of the face position detection apparatus 5. The term "face position" as used herein refers to the position of a limited-size rectangular region (within an input image supplied from the image acquisition section 3) containing the eyes, nose and mouth of a face, with that region preferably being of the smallest size which can accommodate these features. Such a region is illustrated in FIG. 9 for example.

As shown in FIG. 2, the face position detection apparatus 5 includes a sub-image extraction section 10, a judgement value generating section 20, a recognition judgement value memory section 30, a face position judgement section 40, a class evaluation section 50 and a class amendment section 60. The sub-image extraction section 10 applies a scanning window to extract successive sub-images of predetermined size from an input image supplied by the image acquisition section 3. For each sub-image, the judgement value generating section 20 calculates a corresponding recognition judgement value, indicative of the degree of likelihood that the sub-image is a recognition-subject image, i.e., with this embodiment, a face image. The recognition judgement value memory section 30 stores each recognition judgement value obtained by the judgement value generating section 20 in conjunction with information identifying the corresponding sub-image. The face position judgement section 40 determines the detected face position within the input image as the position of the sub-image having the highest recognition judgement value, based on the contents stored in the recognition judgement value memory section 30. The class evaluation section 50 performs judgement for assigning a class (described hereinafter) to the currently extracted sub-image, based on classification results obtained from weak classifiers in the judgement value generating section 20 as described hereinafter. The class amendment section 60 controls respective processing sections within the face position detection apparatus 5, in accordance with the judgement results obtained by the class evaluation section 50.

For simplicity of description, functions executed by the face position detection apparatus 5 are described in the form of the above system sections. However these functions are preferably implemented by programed operation of a computer, or a combination of computer-implemented functions and dedicated circuitry. Memory functions of a model pattern database 53 and weak classifier information database 21 (described hereinafter) are implemented by one or more non-volatile data storage devices such as ROMs, hard disks, etc.

The term "class" of a sub-image is used herein in the following sense. If the sub-image contains only a specific set of main features (e.g., eyes, nose, mouth) which are characteristic of a face image without accessories, it is assigned to a general class. If the image further includes a specific secondary feature such as a head scarf (i.e., in addition to the main features), then the sub-image is assigned to an auxiliary class corresponding to that specific secondary feature.

The embodiment will be described for the case of the general class and a single auxiliary class (referred to as the "No. 1 accessory" class) that is assigned to a face image including a head scarf or turban. However it will be clear that the operation can readily be extended to additional auxiliary classes, e.g., with a "No. 2 accessory" class being assigned to a face image that includes sunglasses.

Sub-Image Extraction Section

The sub-image extraction section 10 extracts successive sub-images from an input image by using a scanning window which traverses from left to right (main scanning direction) and top to bottom (secondary scanning direction) of the input image, covering the entire input image. The sub-images can be extracted such as to subdivide the input image, or such as to successively partially overlap.

The scanning of an entire input image is performed using (in succession) each of a plurality of different prescribed sizes of sub-image (i.e., different sizes of scanning window). With this embodiment the prescribed sizes (determined by the sub-image extraction section 10) are 80×80 pixels, 100×100 pixels, 120×120 pixels, 140×140 pixels, 160×160 pixels, and 180×180 pixels.

Judgement Value Generating Section

The judgement value generating section 20 includes a weak classifier information database 21, having information stored therein beforehand expressing a plurality of weak classifiers, for use in judging whether or not a sub-image extracted from an input image is a face image.

The weak classifiers are established beforehand in a learning phase, with corresponding weights being thereby assigned, using a boosting algorithm in conjunction with a plurality of training images (respective instances of face images and No. 1 accessory images as described hereinafter). As a result, each weak classifier becomes trained for recognition of a feature pattern that is specific to that weak classifier, i.e., to output a 1 or 0 decision value in accordance with whether recognition occurs (positive result) or does not occur (negative result).

Such boosting techniques for generating a plurality of weak classifiers, e.g., using the AdaBoost algorithm as described in reference 1, are well documented, so that detailed description is omitted herein.

In addition, for each class, a value referred to herein as a positive judgement probability is derived (by testing, using recognition-subject image instances corresponding to the class concerned as test images) and stored beforehand for each weak classifier, and stored in memory. Hence with this embodiment each weak classifier has at least two positive judgement probabilities, respectively corresponding to the general class and to the No. 1 accessory class. For each class, each positive judgement probability of a weak classifier with respect to that class expresses the probability that a decision value 1 will be obtained from the weak classifier when applied to an object image which is a recognition-subject image corresponding to that class.

When an object image is assigned to the general class, the entire plurality of weak classifiers are selected as a weak classifier group for use in processing the object image. If the object image is assigned to an auxiliary class then a specific corresponding sub-set of the plurality of weak classifiers is selected as the group corresponding to that auxiliary class, and used in processing the object image.

Preferably, the weak classifiers group corresponding to a specific auxiliary class is selected as follows. For each weak classifier (of the entire plurality of weak classifiers) the positive judgement probabilities respectively corresponding to that auxiliary class and to the general class are compared. Those weak classifiers which have a higher positive judgement probability with respect to the special class than with respect to the general class are thereby determined. All (or the greater part of) these weak classifiers are then excluded from the entire set, and the remaining weak classifiers are designated as the group corresponding to that specific auxiliary class.

Figure 6:
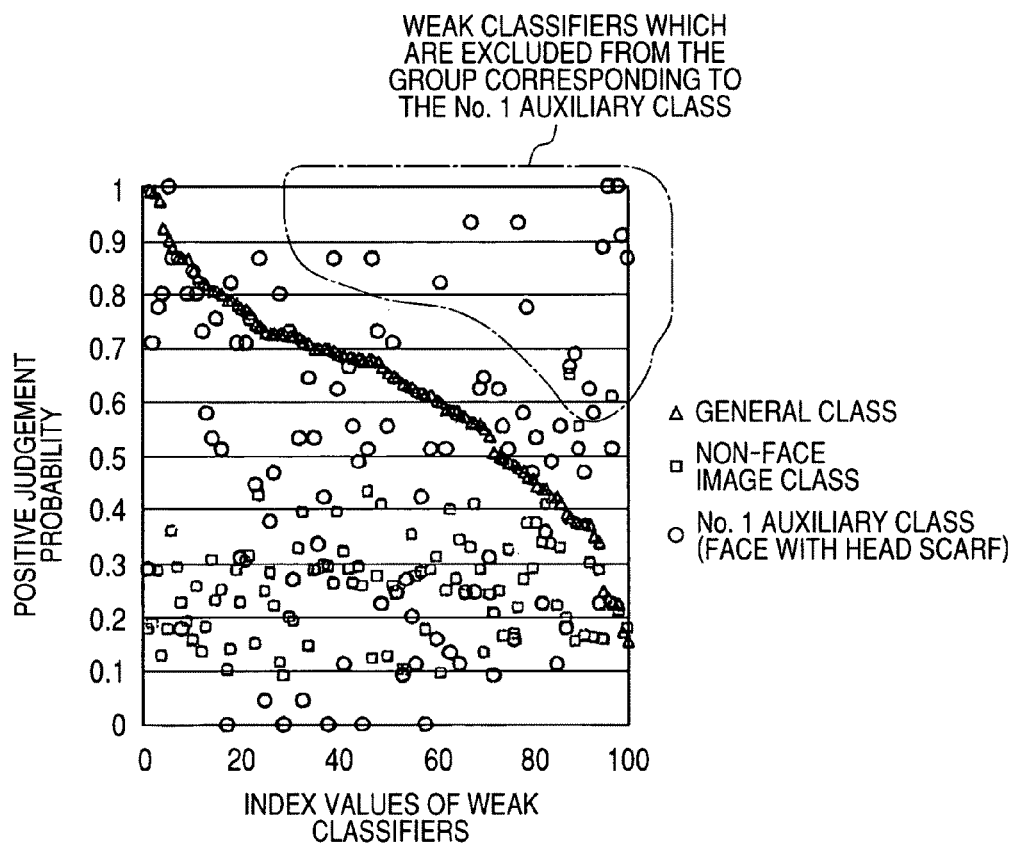
FIG. 6 is a graph corresponding to the contents of the table of FIG. 5.

This is illustrated in the graph of FIG. 6 (described in detail hereinafter), in which 100 points along the horizontal axis respectively correspond to a complete set of 100 weak classifiers. In this example, these weak classifiers have been trained using both general class and No. 1 accessory class images as training images. However it should be noted that, with the present invention, it is not essential to incorporate auxiliary-class images (such as the No. 1 accessory class images) in the training images used for such initial training of the weak classifiers. The circle symbols indicate positive judgement probabilities corresponding to the weak classifiers with respect to the No. 1 accessory class, and the triangle symbols indicate positive judgement probabilities with respect to the general class. Magnitudes of positive judgement probability are plotted along the vertical axis. In this example, the set of weak classifiers respectively corresponding to the circle symbols within the chain-line outline (i.e., each having a higher positive judgement probability with respect to the No. 1 accessory class than with respect to the general class) are excluded, to leave the remaining weak classifiers as the group corresponding to the No. 1 accessory class.

Data expressing each of the weak classifiers are stored in the weak classifier information database 21 in conjunction with their weights, positive judgement probabilities, and respective index values (shown in the table of FIG. 5).

For each class, the weights of the corresponding weak classifier group are normalized to a maximum total value of 1.

The judgement value generating section 20 further includes a classifier selection and application section 22, a likelihood calculation section 23 and a likelihood accumulation section 24. The classifier selection and application section 22 successively selects weak classifiers to be applied in sequence to a currently extracted sub-image as the object image, with these weak classifiers being selected from the group corresponding to the object class (i.e., the class that has been assigned to the input image). The selected weak classifiers of that group are successively read out from the weak classifier information database 21 and applied in sequence. The classifier selection and application section 22 applies a currently selected weak classifier to evaluate the object image, to obtain a 1 or 0 decision value y(t), where "t" indicates the position of the decision value within the sequence.

The likelihood calculation section 23 multiplies each decision value y(t) by the weight w(t) which corresponds to the currently selected weak classifier, to calculate a likelihood L(t). The likelihood accumulation section 24 accumulates the values of likelihood L(1)~L(t) which have been successively obtained for the object image up to the current point in the sequence, to calculate a cumulative likelihood AL(t).

The likelihood L(t) can be expressed by equation (1) below, and the cumulative likelihood AL(t) by equation (2) below.

$$L(t) = y(t) \times w(t) \tag{1}$$

$$AL(t) = \begin{cases} L(1): & t = 1 \\ AL(t-1) + L(t): & t > 1 \end{cases} \tag{2}$$

When processing of an input image is commenced, the object class is provisionally set as the general class.

The judgement value generating section 20 further includes a positive judgement expectation value calculation section 25, an expected likelihood calculation section 26 and a continuation control section 27.

The positive judgement expectation value calculation section 25 calculates a positive judgement expectation value EP(t), which is the total of the respective values of likelihood L that would be obtained from the pending weak classifiers (i.e., those weak classifiers, of the group corresponding to the assigned class, which have not yet been applied in the sequence) if the object image were a recognition-subject image. That is to say, each positive judgement expectation value is a sum of potential weighted decision values, which would be respectively obtained from these pending weak classifiers if the object image were a recognition-subject image such as a face image. With this embodiment, EP(t) is calculated as the total of the respective weights of the pending weak classifiers.

The expected likelihood calculation section 26 calculates an expected likelihood EL(t), by adding the positive judgement expectation value EP(t) to the cumulative likelihood AL(t).

The continuation control section 27 controls the operation of the sub-image extraction section 10, the judgement value generating section 20 and the recognition judgement value memory section 30, based on the values of expected likelihood EL(t) as described in the following.

The positive judgement expectation value EP(t) can be expressed by equation (3) below and the expected likelihood EL(t) by equation (4) below.

In equation (3) the index "j" indicates the sequence position of a weak classifier within the aforementioned pending set. The positive judgement expectation value EP(t) may be more conveniently obtained using equation 3a below.

$$EP(t) = \sum_j w(j) \tag{3}$$

$$EP(t) = 1 - \sum_t w(t) = \begin{cases} 1 - w(1): & t = 1 \\ EP(t-1) - w(t): & t > 1 \end{cases} \tag{3a}$$

$$EL(t) = AL(t) + EP(t) \tag{4}$$

If the sequence of evaluating the object image, by applying successive weak classifiers of the group corresponding to the assigned class, is completed without interruption, the continuation control section 27 stores the finally obtained cumulative likelihood AL(t) in the recognition judgement value memory section 30 as the recognition judgement value for the currently extracted sub-image.

When all of the sub-images have been successively extracted from the input image and processed as described above, the continuation control section 27 controls the face position judgement section 40 to judge the face position based on the recognition judgement values that are left stored in the recognition judgement value memory section 30. Specifically, the face position judgement section 40 detects the face position as corresponding to the location (within the input image) of the sub-image having the highest recognition judgement value.

During processing of an object image by applying successive weak classifiers, the continuation control section 27 compares each newly obtained expected likelihood EL(t)

with a predetermined continuation threshold value Cth (with this embodiment, 0.5). If EL(t) is found to be lower than Cth, this is taken to signify that there is no possibility that the object image is a face image, and so processing of that image (currently extracted sub-image) is interrupted. The continuation control section 27 then stores a zero value (or the currently obtained cumulative likelihood AL(t)) in the recognition judgement value memory section 30, as the recognition judgement value corresponding to that sub-image.

The continuation control section 27 then controls the sub-image extraction section 10 to extract the next sub-image from the input image and applies control for repeating the above-described processing with the newly selected sub-image as the object image.

At each stage during the processing sequence of an object image, if the expected likelihood EL(t) is found to be equal to or greater than the continuation threshold value Cth, the continuation control section 27 applies control for continuing processing that object image by the next weak classifier of the sequence. That is to say, if EL(t) is not less than Cth, then this signifies a possibility that the object image is a face image.

With this embodiment the continuation threshold value Cth is fixed as 0.5. However it would be equally possible to set Cth (each time that an object image has been processed by all of the weak classifiers of a group without interruption) as the maximum recognition judgement value that has been obtained up to that point.

Class Judgement Section

The class evaluation section 50 includes a decision pattern memory section 51, a model pattern database 53, and a class judgement section 55. During processing of an object image, the respective decision values y obtained from successive weak classifiers are written into the decision pattern memory section 51, in conjunction with information (index values) linking the decision values y to the corresponding weak classifiers.

The model pattern database 53 has a plurality of model patterns stored therein beforehand, each corresponding to a specific class. For each class, the corresponding model pattern is a pattern of decision values that can be expected to be obtained by a specific sub-set of the plurality of weak classifiers when successively applied to a recognition-subject image corresponding to that class. With this embodiment, each model pattern is established in accordance with the positive judgement probabilities of that specific sub-set of weak classifiers with respect to the class concerned, i.e., with these positive judgement probabilities being respectively quantized to 1 or 0 by using a threshold of 0.5, to obtain the corresponding model pattern.

This is illustrated in the example of FIG. 7, in which the aforementioned specific set of weak classifiers consists of the first 30 weak classifiers (arranged in order of increasing index values), i.e., a specific sub-set of the aforementioned entire set of 100 weak classifiers.

As in this example, this sub-set is preferably made up of weak classifiers which are selected in the initial stages of the sequence of applying weak classifiers to the object image, and which are common to each of the weak classifier groups corresponding to respective classes. Model patterns established for the general class and for the No. 1 accessory class respectively are shown.

During the processing sequence of an object image, when the number of successively obtained decision values y reaches a predetermined value (e.g., 30, with the example of FIG. 7), the class judgement section 55 compares the pattern of these decision values (referred to as the output decision pattern) with each of the model patterns held in the model pattern database 53. The class judgement section 55 then assigns to the input image the class corresponding to the model pattern which conforms most closely to the output decision pattern, i.e., designates the class corresponding to that model pattern as the object class.

As an alternative to evaluating such a fixed number of successive decision values, it would be possible to configure the apparatus to monitor the trend of successive patterns of decision values obtained during the sequential processing of an object image, and to detect the point at which one of these patterns attains a sufficient degree of conformance with one of the model patterns.

The stored contents of the decision pattern memory section 55 are deleted each time a new sub-image is extracted to be processed.

Class Amendment Control Section

When the class judgement section 55 judges the object class as described above, if it is found that the object class is different from the currently assigned object class, the class judgement section 55 supplies information specifying the newly determined object class to the class amendment section 60. In response, the class amendment section 60 controls the likelihood accumulation section 24 and the recognition judgement value memory section 30 to discard the processing results obtained for the input images up to that point, i.e., the cumulative likelihood AL(t) and all of the recognition judgement values (held in the recognition judgement value memory section 30) obtained for the input image are each reset to zero.

The class amendment section 60 further controls the classifier selection and application section 22 and likelihood accumulation section 24 to interrupt the processing sequence of the object image, and to restart the processing of the input image from the beginning, applying weak classifiers of the group corresponding to the newly determined object class.

Operation

Figure 3:
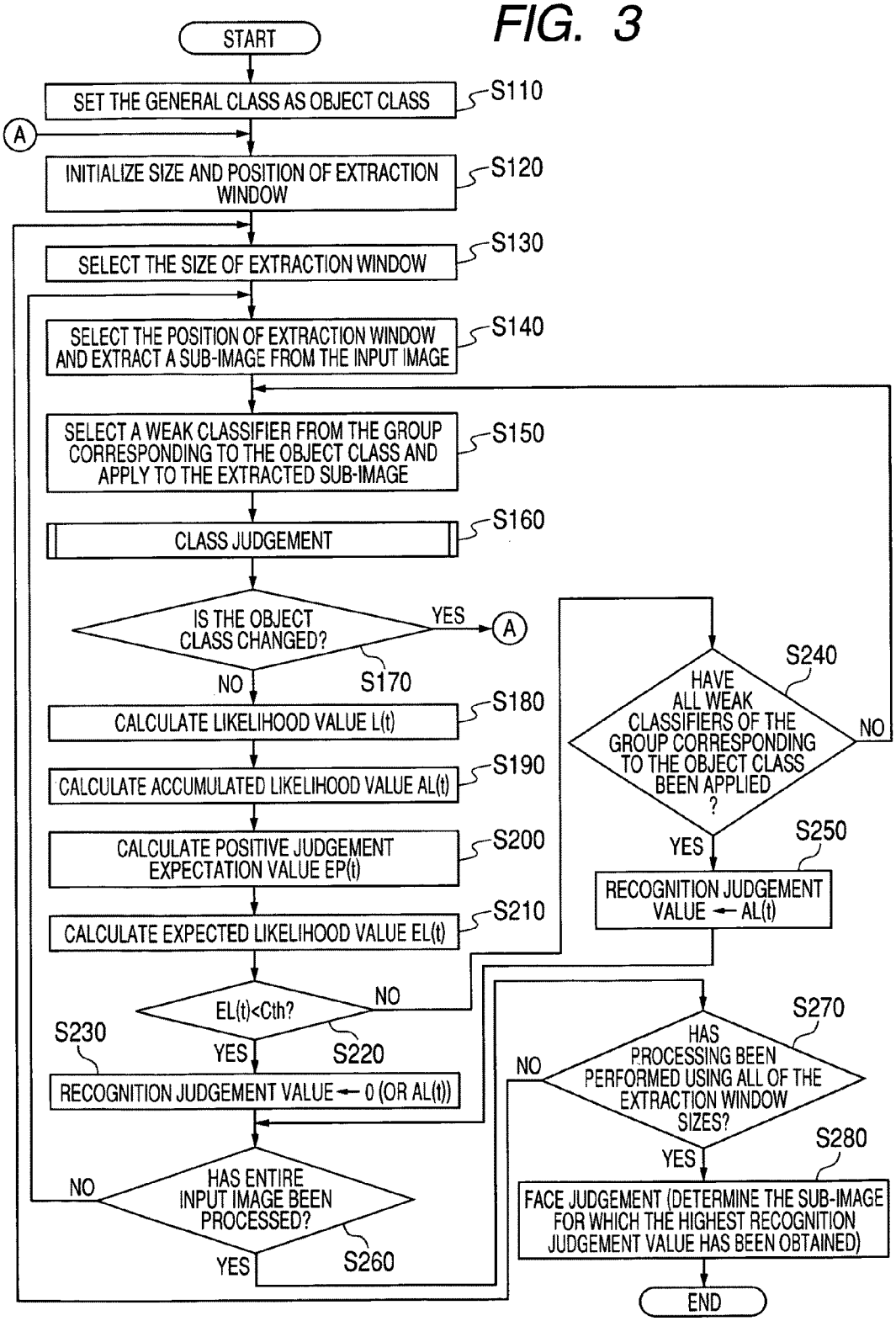
FIG. 3 is a flow diagram of processing executed by a face position detection section of the embodiment.

The overall processing flow of the face position detection apparatus 5, applied to an image received from the image acquisition section 3, will be described referring to the flow diagram of FIG. 3. It should be noted that although the embodiment is described for the case of a single auxiliary class, the processing of FIG. 3 would also apply in the case of a plurality of auxiliary classes.

Firstly (step S110) the object class is provisionally set as the general class, i.e., the classifier selection and application section 22 becomes controlled to select the weak classifiers of the group corresponding to the general class (i.e., the entire set of weak classifiers).

Next (step S120) the sub-image extraction section 10 initializes the size and position of the scanning window, (extraction window). The size and position will thereafter each be changed in a predetermined sequence. The size of the scanning window is then selected in step S130, and in step S140 the position of the scanning window is updated, with a new sub-image having the size of the scanning window being thereby extracted from the input image, to be processed as the object image.

In the first execution of step S130 following step S120 the smallest size of scanning window is selected. Thereafter in successive executions of S130, successively larger sizes are selected. In the first execution of step S140 following step S130, the scanning window is set to the upper leftmost position in the input image, to extract a sub-image that located at that position. Thereafter in successive executions of step S140, the scanning window is successively scanned from left to right (main scanning direction) and top to bottom (secondary scanning direction) of the input image, to extract successive sub-images.

Step S150 is executed following step S140 or step S240 (described hereinafter). In the first execution of step S150 following step S140, the first weak classifier of the group corresponding to the object class is selected and is applied in processing the object image. Thereafter in successive executions of step S150, classifiers from the selected weak classifier group are sequentially applied to the object image. With this embodiment, the weak classifiers are assumed to be applied in order of decreasing positive judgement probabilities with respect to the general class.

At each execution of step S150 a decision value y is obtained, and stored in the decision pattern memory section 55 as described above. In step S160 the decision values y which have been stored up to the current point are used in processing for judging the class that is to be assigned as the object class.

Figure 4:
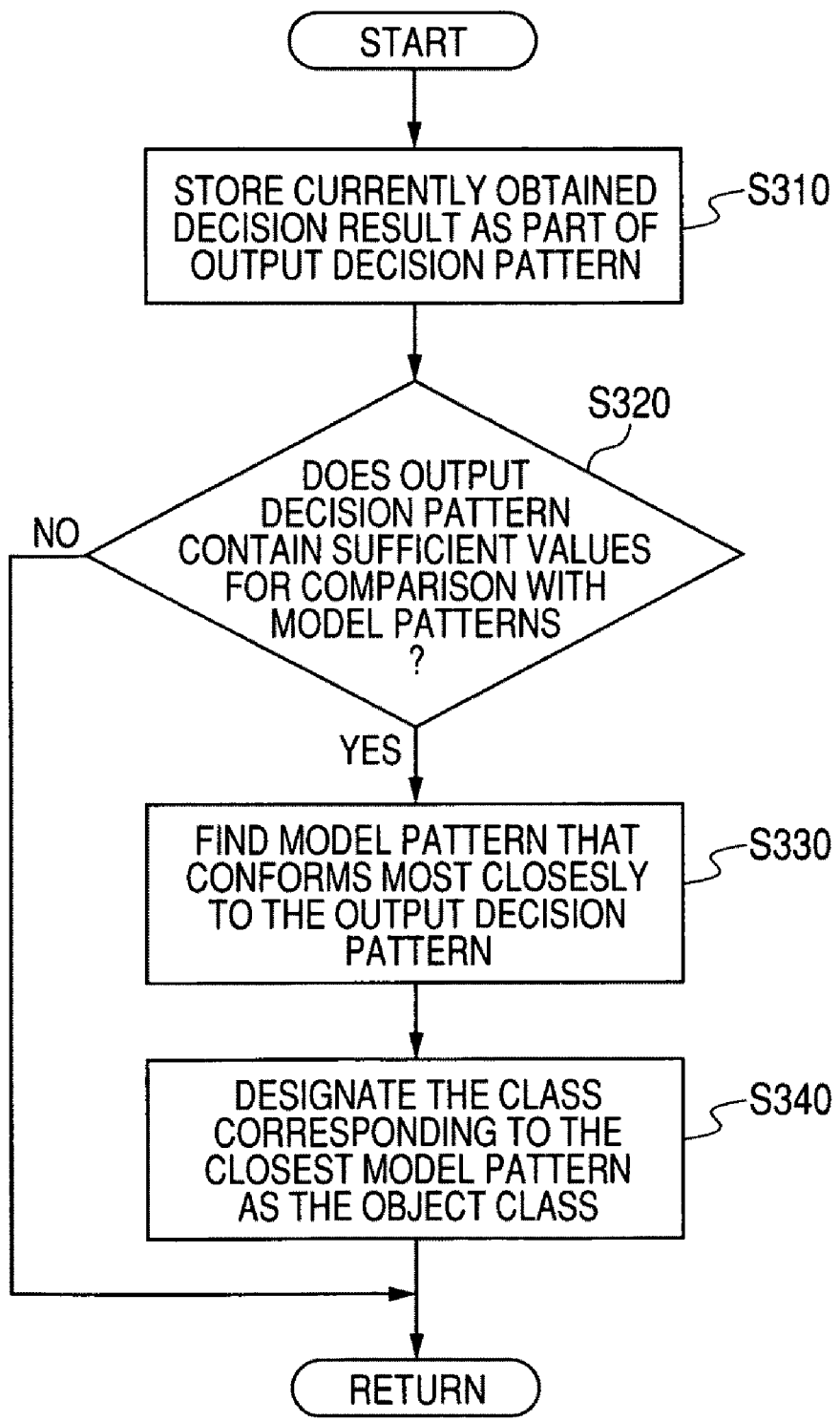
FIG. 4 is a flow diagram of processing executed by a class judgement processing section.

FIG. 4 is a flow diagram showing the class judgement processing executed in step S160. Firstly, the most recent decision value y obtained in step S150 is stored in the decision pattern memory section 55 together with information (index number) identifying the corresponding weak classifier (step S310). Next a decision is made (step S320) as to whether the total number of decision values y obtained for the object image has reached a predetermined amount (e.g., 30, in the case of the example of FIG. 7). If that amount has not yet been reached, the class judgement processing is terminated and operation proceeds to step S170 of FIG. 3, with the object class left unchanged.

However if the total number of successively stored decision values y has reached the predetermined amount, these values are processed as an output pattern. Specifically, the output pattern is compared (step S330) with each of a plurality of model patterns (corresponding to respective classes, as described above). The model pattern having closest conformance with the output pattern is selected, and the class corresponding to the selected model pattern is then specified as the object class (step S340).

Returning to FIG. 3, following step S170, a decision is made in step S170 as to whether (based on the class judgement results) the object class is to be changed. If so, the value obtained for AL(t) and the recognition judgement values which have been obtained for the input image up to that point are discarded, and operation returns to step S120, with the class determined in step S160 being assigned as the object class.

Processing of the input image is then recommenced, from step S120, and proceeds as described above.

However if it is determined in step S170 that the object class is not to be changed, the likelihood calculation section 23 calculates the likelihood L(t) (step S180), using the decision value y that was obtained in the preceding execution of step S150. Next in step S190, the cumulative likelihood AL(t) for the object image is calculated by the likelihood accumulation section 24.

The positive judgement expectation value calculation section 25 then calculates the expected positive judgement value EP(t) (step S200) and in step S210 the expected likelihood calculation section 26 uses AL(t) and EP(t) to calculate the expected likelihood EL(t) for the object image.

Next in step S220, the expected likelihood EL(t) is compared with the continuation threshold value Cth. If EL(t) is judged to be less than Cth, then the sequential processing of the object image is interrupted and a recognition judgement value of zero is stored in the recognition judgement value memory section 30 for the object image, i.e., is stored as the recognition judgement value corresponding to the currently extracted sub-image (step S230). (Alternatively, the cumulative likelihood AL(t) value obtained up to the point of interruption could be stored, instead of a zero value).

However if it is found in step S220 that the expected likelihood EL(t) is not less than the continuation threshold value Cth, then since processing of the object image is to continue, the classifier selection and application section 22 judges whether there are any pending weak classifiers (those of the group corresponding to the object class which have not yet been applied to the object image) (step S240). If there are any pending weak classifiers, operation returns to step S150. The processing of steps S150 to S220 is then repeated.

If it is found in step S240 that all of the weak classifiers of the group corresponding to the object class have been applied, processing of the object image is ended and the cumulative likelihood AL(t) is stored in the recognition judgement value memory section 30 as the recognition judgement value for the object image, i.e., for the currently extracted sub-image (step S250).

When processing of the object image has terminated normally (step S250 executed) or has become interrupted (step S230 executed), the sub-image extraction section 10 then judges whether the scanning window has completed successive shifting from the upper left corner to the lower right corner of the input image (S260). If that has not yet been completed, operation proceeds to step S140 to extract a new sub-image, and the processing of steps S140 to S250 is repeated for that sub-image.

If it is judged in step S260 that the successive shifting of the scanning window has been completed, then this signifies that processing using the currently set size of scanning window has been completed. The sub-image extraction section 10 then judges whether scanning of the input image has been completed for all of the scanning window sizes (step S270). If any size has not yet been selected, operation returns to step S130, and steps S130 to S260 are repeated with a new size of scanning window being selected in step S130.

If it is found in step S270 that processing of the object image using all of the scanning window sizes has been completed, then since this signifies that all requisite processing of the input image has been completed, the face position judgement section 40 performs face position judgement. Specifically, the face position judgement section 40 judges the recognition judgement values which have become stored in the recognition judgement value memory section 30, to determine the sub-image having the highest recognition judgement value. The face position is then judged to be the position of that sub-image within the input image (S280). The processing then ends.

Results

With the above embodiment, each time a decision value is obtained for the object image by a weak classifier, a judgement is made as to whether to reject the object image (interrupt the sequence of applying weak classifiers). In the prior art, such a judgement is made based only upon results obtained up to the current point in the sequence, for example based upon the total of the weighted decision values obtained up to that point, i.e., using only information obtained from those weak classifiers which have been applied up to that point. However with the present invention, that judgement is also based upon information obtained from weak classifiers which have not yet been applied in the sequence, i.e., the pending weak classifiers.

With the above embodiment for example, this is done by basing the judgement upon the total (EP(t)) of the respective weights of the pending weak classifiers as well as upon the total (AL(t)) of the weighted decision values obtained up to that point in the sequence.

As a result, when the invention is applied to face recognition, not only can the time required to detect a face position within an input image be shortened, but also the reliability such detection can be increased. This is due to the fact that accurate recognition can be achieved for a wider degree of variation in features of a face image than has been possible in the prior art. The invention thereby enables a more reliable face position detection apparatus to be provided than has been possible in the prior art, for use in a driver support apparatus.

Furthermore with the present invention, a class (general class or auxiliary class) can be assigned to an input image based upon results of applying the weak classifiers to sub-images of that input image. These sub-images can be thereby be processed by applying a group of weak classifiers corresponding to the assigned class, i.e., a group which has been predetermined as appropriate for recognition of images belonging to that class.

Furthermore when it is required to achieve recognition of a new class of images, containing a specific secondary feature (such as a head scarf), i.e., it is unnecessary to perform retraining of all of the weak classifiers (i.e., using training images which include a small number of images in accordance with the new class). Instead, a group of weak classifiers appropriate for recognition of images belonging to the new class can be obtained by measuring the respective values of positive judgement probability of each of the (entire set of) weak classifiers with respect to images in accordance with the new class. All (or part) of the weak classifiers which have a higher positive judgement probability with respect to general-class images than with respect to images in accordance with the new class are then excluded (see FIGS. 5 and 6). The respective weights of the remaining weak classifiers are then normalized to a total value of 1, to thereby constitute a group of weak classifiers which are appropriate for recognition of images belonging to the new class. Extensive retraining of the weak classifiers by using a large number of training images, as would be required in the prior art in such a case, can thereby be avoided, so that expenditure of a large amount of time and effort can be avoided.

As described in reference 1, some or all of the weak classifiers may each be configured as a plurality of "simple classifiers" (e.g., each simple classifier evaluating a single simple feature), with the decision value from such a weak classifier being based on a total of respective weighted decision values from its simple classifiers. In such a case, the weight of a weak classifier (i.e., to be normalized for use as the value w in equations (1) and (3) above) can for example be set as the total of the respective weights of its simple classifiers Test Example A test example of an image recognition apparatus in accordance with the above embodiment will be described in the following.

The apparatus utilizes a total of 100 weak classifiers. FIG. 5 is a table which relates a positive judgement probability to each of these weak classifiers, for each of three classes. These are the general class (face without accessories such as head scarfs etc.), a single auxiliary class (No. 1 accessory class, i.e., faces with head scarf), and a non-face image class.

The values in FIG. 1 were derived by the following procedure. Firstly, 2400 training images in accordance with the general class (i.e., each image showing a face without accessories), and 90 training images in accordance with the No. 1 accessory class (i.e., each image showing a face with head scarf) were prepared. In addition, 2400 non-face images (in which no face appears) were prepared as a test class for reference purposes.

Each of these sets of images for the respective classes was then divided in half, and training processing was performed using these half-sets of images, applying the AdaBoost algorithm, to obtain 100 weak classifiers with respective weight values.

Processing to derive positive judgement probabilities was then performed, firstly using the 1200 remaining general-class training images (i.e., those not used in the training process) as test images. Each test image used in this processing should preferably be limited to expressing the main facial features (e.g., forehead, eyes, nose, mouth). Where necessary, the 1200 remaining training images were appropriately cropped to extract suitable test images.

Each of the 100 weak classifiers was then evaluated by being successively applied to each of these 1200 general-class test images. For each weak classifier, the proportion of decision values that were equal to 1 (i.e., proportion of positive decisions) obtained from this test was registered as the positive judgement probability (in the range 0 to 1) corresponding to that weak classifier with respect to the general class.

The weak classifiers were then assigned respective index values. In the example of FIG. 5, for ease of understanding, the index values are assigned in order of decreasing values of positive judgement probability with respect to the general class, from 1 to 100, as shown in the first column of FIG. 5. However it should be noted that it is not essential to assign the index values in any specific order. These positive judgement probabilities and the respective weights obtained for the weak classifiers were then stored in memory, associated with their respective index values.

Figure 8:
FIG. 8 shows an example of face position detection results obtained by applying a prior art type of face recognition apparatus to an image of a face with head scarf.

When testing was performed by applying the entire set of weak classifiers to various images which were in accordance with the No. 1 accessory class (i.e., faces with head scarfs) it was found that accurate recognition was not achieved. Specifically, sub-images which showed incorrect parts of a face (i.e., displaced from the requisite part, containing the eyes, nose and mouth) were incorrectly detected as illustrated in FIG. 8.

Test images corresponding to the No. 1 accessory class images were then obtained from the 45 remaining training images corresponding to the No. 1 accessory class. These 45 test images were then used as described for the general-class test images, to obtain a positive judgement probability for each weak classifier with respect to the No. 1 accessory class. These positive judgement probabilities were then stored in memory in conjunction with their corresponding index values.

A similar operation was performed using the remaining 1200 non-face images, to obtain positive judgement probabilities for the weak classifiers with respect to non-face images (for comparison purposes), and these values were similarly stored.

FIG. 5 shows the three sets of positive judgement probabilities thereby obtained for the 100 weak classifiers with respect to the three classes, with the corresponding index values of the weak classifiers.

FIG. 6 shows a corresponding graph of the values appearing in FIG. 5.

The weak classifier group corresponding to the No. 1 accessory class was then selected. This was done by first determining those weak classifiers (from within the entire set of 100) having a higher positive judgement probability with respect to No. 1 accessory class images than with respect to the general image class. Of these, a group having the highest values of the ratio {positive judgement probability with respect to No. 1 accessory class/positive judgement probability with respect to general image class}, i.e., a group of those weak classifiers which are most sensitive to No. 1 accessory class images, were then excluded.

That is to say, those weak classifiers which have an incorrect response to the specific feature (head scarf) of the No. 1 accessory class images, and which are therefore likely to incorrectly detect a displaced sub-image (as in the example of FIG. 8) are excluded, leaving a set of weak classifiers which are likely to detect a sub-image which is at the correct location within a face image.

In the example of FIG. 6, this is done by excluding the 15 weak classifiers corresponding to the values indicated within the broken-line outline, leaving a total of 85 weak classifiers as the group corresponding to the No. 1 accessory class.

In addition, the respective weights determined for the weak classifiers in the training process were normalized such that, for each of the classes, the total of the normalized weights of the weak classifier group corresponding to that class is made equal to 1.

For example, the normalized weight w (with respect to the general class) obtained for the weak classifier having index value 1 was 0.016. In that case, if the decision value obtained from the first weak classifier of the sequence (having index value 1) is y=0, then the likelihood $L(1)=AL(1)=0$, while if the decision value is y=1, then $L(1)=AL(1)=0.016$. In either case, the positive judgement expectation value $EP(1)$ is 0.984. If the decision value y=0, then the expected likelihood $EL(1)=0.984$, while if y=1 then $EL(1)=1$.

FIG. 7 is a table of model patterns respectively corresponding to the general class and to the No. 1 accessory class, derived from the positive judgement probabilities shown in FIG. 5. The patterns have been obtained for the weak classifiers having index values in the range 1 to 30 as shown, and are derived by quantizing the corresponding positive judgement probabilities for these 30 weak classifiers to 1 or 0 values, using a threshold of 0.5.

As can be understood from the above, for each class, the positive judgement probability for a weak classifier (with respect to that class) is indicative of the degree of probability that a positive decision value will be obtained by that weak classifier when it is applied to an object image which corresponds to the class concerned.

The lowermost stage in FIG. 7 shows an example of the pattern of decision values y obtained when the aforementioned sub-set of 30 weak classifiers was applied to an object image which was a face image with head scarf (No. 1 accessory class image). In this case the degree of conformance with the model pattern corresponding to the No. 1 accessory class is found to be 0.93, whereas the degree of conformance with the model pattern corresponding to the general class is 0.7. Hence the object image will be assigned (i.e., in step S160 of FIG. 3 as described above) to the No. 1 accessory class.

FIG. 8 illustrates an example of a result obtained in judging face position for the case of a No. 1 accessory class of input image, using a prior art type of image recognition apparatus. As indicated, an incorrect one of the extracted sub-images has been judged to be a face image, so that the face position will be incorrectly judged. FIG. 9 is a corresponding example of results obtained using the above embodiment. In this case the No. 1 accessory class has been correctly assigned as the object class, and recognition processing has thus been performed by applying a group of weak classifiers which are appropriate for detecting a face image with head scarf. As a result, successful recognition is achieved, irrespective of the presence of the head scarf.

With the above embodiment, there is a single object (face image) whose position is to be detected, i.e., an object which appears at only a single position within an input image. That position is detected as the position of a sub-image for which a maximum output is obtained from the weak classifiers. However the invention is equally applicable to a case in which there are a plurality of instances of a recognition-subject image (for example, a plurality of faces located at respectively different positions within an input image) which are to be detected within an input image. In such a case, the required detected positions within the input image can be obtained as the positions of respective sub-images for which the recognition judgement value exceeds a predetermined threshold.

Second Embodiment

A second embodiment is described in the following. This differs from the first embodiment only with respect to the manner of calculating the expected positive judgement value EP(t) used in equation (4) above, i.e., processing that is performed by the positive judgement expectation value calculation section 25, and with respect to the value of the continuation threshold value Cth used by the continuation control section 27. Only these points of difference will be described in the following.

Judgement Value Generating Section

With the second embodiment, the positive judgement expectation value calculation section 25 calculates the expected positive judgement value EP(t) by multiplying the positive judgement probability p of each weak classifier in the pending set by the corresponding weight w for that weak classifier, and obtaining the sum of the resultant products, as expressed by equation (5) below:

$$EP(t) = \sum_j p(j)w(j) \tag{5}$$

Continuity Control Section

The calculated expected positive judgement value EP(t) thus reflects the positive judgement probabilities of the pending set of weak classifiers, as well as the respective weights of these. Hence, the expected likelihood EL(t) is smaller than for the case of the first embodiment. The continuation threshold value Cth can therefore be set to a smaller value than is possible with the first embodiment. For example, Cth can be set to 0.3.

The second embodiment provides similar effects to those described for the first embodiment, while enabling more precise judgement to be made as to whether to interrupt the processing of an object image.

Since the second embodiment differs from the first embodiment only with respect to the points described above, similar effects to those described for the first embodiment referring to FIG. 9 can be obtained with the second embodiment.

Third Embodiment

With the above embodiments, the class to be assigned to the input image (by execution of step S160 of FIG. 3) is determined based on decision value patterns obtained from a specific sequence of the weak classifiers (e.g., as described referring to FIG. 7, a fixed sequence of weak classifiers having index values from 1 to 30). However it is equally possible to assign an appropriate class to the input image by using the aspect of the present invention whereby it is unnecessary to apply the weak classifiers to the object image in a fixed sequence. This will be described for the case of a third embodiment, which basically differs from the above embodiments only with respect to the class judgement operation (corresponding to step S160 of FIG. 3).

The class judgement operation of this embodiment is illustrated by the logic tree diagram of FIG. 10, in which the values are based on the positive judgement probabilities shown in FIG. 5. FIG. 10 is a simplified diagram, intended only to illustrate the principles of assigning a class to an input image with this embodiment.

Firstly in step S1 of FIG. 10, in the first execution of step S150 after a new sub-image has been extracted as the object image (i.e., first execution of S150 following an execution of step S140), the input image is provisionally assigned to the general class, and weak classifier 1 (i.e., the weak classifier having index value 1) is selected to be applied. Since the positive judgement probability for weak classifier 1 is less than 0.5 only with respect to a non-face image or a No. 1 accessory image, a decision value y of 0 following step S1 indicates that the object image is probably a non-face image or a No. 1 accessory class image. Hence in the first execution of step S160, weak classifier 3 is selected (step S2) if a 0 result has been obtained by weak classifier 1. Weak classifier 3 has a positive judgement probability less than 0.5 only with respect to a non-face image. Hence if a 0 decision value is obtained from weak classifier 3 following step S2, this indicates that the object image is a non-face image. To confirm this, weak classifier 5 (having a positive judgement probability less than 0.5 only with respect to a non-face image) is selected in step S3, in the next execution of step S160. If a 0 decision value is obtained from weak classifier 5, then this is taken to further indicate that the object image is a non-face image. The system can be configured for example whereby in such a case, the previously assigned object class is left unchanged (i.e., NO decision in step S170 of FIG. 3).

By similar reasoning, if weak classifier 1 produces a decision value y=1 following step S1, weak classifier 8 is then selected in step S7. If a decision value y=1 is obtained following step S7, and also after weak classifier 17 is selected in S8, this is taken as indicating that the input image corresponds to the general class, i.e., the object class should be set as the general class.

Similarly, the object class should be set as the No. 1 accessory class if a decision value y=1 is reached in each of steps S2 and S5 of FIG. 10.

In other respects, operation of this embodiment can be similar to that of the first or second embodiments above. If an indecisive result is obtained at any step (e.g., a decision value of 1 in either of steps S3 or S5, or a value of 0 in steps S7 or S8) then predetermined extended judgement operations may be performed, or the object class may be left unchanged, for example.

When a class has thus been assigned to the input image, the remaining weak classifiers of the group corresponding to that class are thereafter successively selected to be applied to the object image in respective executions of step S150, as described for the preceding embodiments.

It will be understood that such a procedure for assigning the image class can be implemented using other weak classifiers than those indicated in FIG. 10, or using larger numbers of weak classifiers to reach a judgement.

Other Embodiments

It should be noted that the invention is not limited to the above embodiments, and that various modifications and alternative configurations of these embodiments could be envisaged, which fall within the scope claimed for the invention as set out in the appended claims.

For example, with the first and second embodiments, the selection of the weak classifiers (to be applied in successively evaluating an object image) is performed in a predetermined sequence, i.e., in order of the index values. However as can be understood from the third embodiment above, the invention is not limited to this, and it would be equally possible for example to select the weak classifiers in a random sequence, by using random numbers.

The invention has been described above for the case of an accessory-disposed face being a face with a head scarf (No. 1 accessory class) or with sunglasses (No. 2 accessory class), in addition to the general class (face without accessory). However it would be equally possible for an accessory-disposed face to be a face which is partially covered by a mask, etc.

Furthermore with the above embodiments, the decision as to whether to continue processing of an object image by successive weak classifiers is made based upon whether or not the expected likelihood EL(t) has become smaller than the continuation threshold value Cth. However it would be equally possible to configure the apparatus to make that decision based on a trend (e.g., rate of increase or of decrease) of the successively obtained values of expected likelihood obtained from weak classifiers as they are sequentially applied to the object image.

Furthermore although the above embodiments have been described for the case in which the recognition-subject image is a face image, it will be understood that the invention could equally be applied to various other types of image.

It should be noted that in the appended claims, the phrase "decision value likely to be obtained by a weak classifier" is to be understood as signifying a decision value having a probability of being obtained which is greater than a predetermined minimum degree of probability.

What is claimed is:

1. An image recognition apparatus comprising
   an image extraction module for using an extraction window having a predetermined specified size to successively extract a plurality of partial images from an input image, such that said partial images extend entirely over said input image, and
   a judgement value calculation module for calculating respective judgement values corresponding to said partial images that are extracted by said partial image extraction module, each of said judgement values expressing a degree of probability that the corresponding partial image is a recognition-objective image having predetermined characterizing main features, wherein a partial image for which the corresponding judgement value calculated by said judgement value calculation module is a maximum (among the judgement values obtained for all of the partial images) is classified as being said recognition-objective image by said image recognition apparatus;

wherein said judgement value calculation module comprises a discrimination module comprising a plurality of weak classifiers corresponding to respective images having different specific patterns, each weak classifier outputting a value 1 when it is judged that an input image is said recognition-objective image and outputting a value 0 when it is judged that the input image is not said recognition-objective image, a classifier selection module for appropriately selecting a weak classifier of said classifier selection module, to be applied to an object image which has been extracted as a partial image by said image extraction module, a likelihood value calculation module functioning, each time that a weak classifier is selected by said classifier selection module, to obtain a likelihood value, said likelihood value being calculated by multiplying a result value obtained by applying said selected weak classifier to said object image by a weighting value, said weighting value being predetermined as corresponding to said selected weak classifier, a cumulative likelihood value calculation module for cumulatively adding said likelihood values obtained by said likelihood value calculation module, to obtain a cumulative likelihood value, an expected likelihood value calculation module for calculating a positive judgement expectation value as a total of respective output values which would be produced, if the object image were judged to be the recognition-objective image, by all of those weak classifiers that have not yet been applied to said object image, and adding said positive judgement expectation value to said cumulative likelihood value to thereby obtain an expected likelihood value corresponding to the object image, and a continuation control module for judging whether said expected likelihood value exceeds a predetermined continuation threshold value, and when said continuation threshold value is exceeded, causing said classifier selection module to select a next one of said weak classifiers, while, if there is no succeeding weak classifier to be selected or said expected likelihood value does not exceed said continuation threshold value, said continuation control module terminates the processing of said object image and outputs said cumulative likelihood value calculated by said cumulative likelihood value calculation module as said judgement value corresponding to the object image.

2. An image recognition apparatus according to claim 1, further comprising a model pattern memory module having model patterns stored therein corresponding to respective classes, said classes comprising images which include said recognition-objective image and which have been classified in accordance with secondary features that are different from said main features, each of said model patterns being a pattern of output values that should be produced from said weak classifiers when said weak classifiers are applied to an image of the class corresponding to that model pattern, an output trend memory module having stored therein relationships between said weak classifiers selected by said weak classifier selection module and corresponding recognition results obtained from said weak classifiers, and a class selection module for specifying, from within the stored contents of said model pattern memory module, a model pattern which is closest to the stored contents of said output trend memory module, and for selecting the class corresponding to said specified model pattern as the class of said object image;

wherein said discrimination module comprises class-related classifier groups respectively corresponding to said classes, each of said class-related classifier groups comprising a plurality of weak classifiers that are appropriate for being applied to images of the corresponding class, and said classifier selection module selects the weak classifier to be applied to said object image from within a class-related classifier group that corresponds to a class which is selected by said class selection module.

3. An image recognition apparatus according to claim 2, wherein designating a positive judgement probability as the probability that recognition will be achieved and an output value of 1 thereby produced by a weak classifier, when the weak classifier is applied to an input image which should be recognized as the recognition-objective image, said class-related classifier group corresponding to a selected class is configured by subtracting, from all of the weak classifiers of said discrimination module, at least a part of those weak classifiers for which respective values of positive judgement probability obtained with respect to images having the secondary features corresponding to said selected class are higher than the values of positive judgement probability which are obtained with respect to images having only said main features.

4. An image recognition apparatus according to claim 3 comprising a class updating control module, said class updating control module functioning, when a selected class is found to be different from a class that is specified by said class selection module, to destroy results which have been obtained by calculations applied to the input image that is currently being processed, and to restart the processing of that input image from the beginning.

5. An image recognition apparatus according to claim 3, wherein said image extraction module repetitively performs said partial image extraction, varying said specified size of said extraction window.

6. An image recognition apparatus according to claim 3, wherein said weak classifiers are trained by using a boosting algorithm.

7. An image recognition apparatus according to claim 2 comprising a class updating control module, said class updating control module functioning, when a selected class is found to be different from a class that is specified by said class selection module, to destroy results which have been obtained by calculations applied to the input image that is currently being processed, and to restart the processing of that input image from the beginning.

8. An image recognition apparatus according to claim 7, wherein said image extraction module repetitively performs said partial image extraction, varying said specified size of said extraction window.

9. An image recognition apparatus according to claim 7, wherein said weak classifiers are trained by using a boosting algorithm.

10. An image recognition apparatus according to claim 2, wherein said image extraction module repetitively performs said partial image extraction, varying said specified size of said extraction window.

11. An image recognition apparatus according to claim 10, wherein said weak classifiers are trained by using a boosting algorithm.

12. An image recognition apparatus according to claim 2, wherein said weak classifiers are trained by using a boosting algorithm.

13. An image recognition apparatus according to claim 1, wherein said image extraction module repetitively performs said partial image extraction, varying said specified size of said extraction window.

14. An image recognition apparatus according to claim 1, wherein said weak classifiers are trained by using a boosting algorithm.

15. An image recognition apparatus comprising
an image extraction module for using an extraction window having a predetermined specified size to successively extract a plurality of partial images from an input image, such that said partial images extend entirely over said input image, and
a judgement value calculation module for calculating respective judgement values corresponding to said partial images that are extracted by said partial image extraction module, each of said judgement values expressing a degree of likelihood that the corresponding partial image is a recognition-objective image having predetermined characterizing main features,
wherein a partial image for which the corresponding judgement value calculated by said judgement value calculation module is a maximum (among the judgement values obtained for all of the partial images) is classified as being said recognition-objective image by said image recognition apparatus;
wherein said judgement value calculation module comprises
a discrimination module comprising a plurality of weak classifiers corresponding to respective images having different specific patterns, each weak classifier outputting a value 1 when it is judged that an input image is said recognition-objective image and outputting a value 0 when it is judged that the input image is not said recognition-objective image,
a classifier selection module for appropriately selecting a weak classifier of said classifier selection module, to be applied to an object image which has been extracted as a partial image by said image extraction module,
a likelihood value calculation module functioning, each time that a weak classifier is selected by said classifier selection module, to obtain a likelihood value, said likelihood value being calculated by multiplying a result value obtained by applying said selected weak classifier to said object image by a weighting value, said weighting value being predetermined as corresponding to said selected weak classifier,
a cumulative likelihood value calculation module for cumulatively adding said likelihood values obtained by said likelihood value calculation module, to obtain a cumulative likelihood value,
an expected likelihood value calculation module for calculating, for each of respective weak classifiers that have not yet been applied to said object image, a product of a positive judgement probability and a weighting value respectively predetermined as corresponding to said weak classifier, said positive judgement probability being a probability that a value of 1 will be outputted by said weak classifier when applied to an object image which is said recognition-objective image, and wherein said expected likelihood value calculation module calculates a positive judgement expectation value as a total of all of respective products thereby obtained for all of said weak classifiers that have not yet been applied to said object image, and adds said positive judgement expectation value to said cumulative likelihood value to thereby obtain an expected likelihood value corresponding to the object image, and
a continuation control module for judging whether said expected likelihood value exceeds a predetermined continuation threshold value, and when said continuation threshold value is exceeded, causing said classifier selection module to select a next one of said weak classifiers, while, if there is no succeeding weak classifier to be selected or said expected likelihood value does not exceed said continuation threshold value, said continuation control module terminating the processing of said object image and outputs said cumulative likelihood value calculated by said cumulative likelihood value calculation module as said judgement value corresponding to the object image.

16. An image recognition apparatus according to claim 15, comprising
a model pattern memory module having model patterns stored therein corresponding to respective classes, said classes comprising images which include said recognition-objective image and which have been classified in accordance with secondary features that are different from said main features, each of said model patterns being a pattern of output values that should be produced from said weak classifiers when said weak classifiers are applied to an image of the class corresponding to that model pattern,
an output trend memory module having stored therein relationships between said weak classifiers selected by said classifier selection module and corresponding recognition results obtained from said weak classifiers, and
a class selection module for specifying, from within the stored contents of said model pattern memory module, a model pattern which is closest to the stored contents of said output trend memory module, and for selecting the class corresponding to said specified model pattern as the class of said object image;
wherein said discrimination module comprises class-related classifier groups respectively corresponding to said classes, each of said class-related classifier groups comprising a plurality of weak classifiers that are appropriate for being applied to images of the corresponding class, and
said classifier selection module selects the weak classifier to be applied to said object image from within a class-related classifier group that corresponds to a class which is selected by said class selection module.

17. An image recognition apparatus according to claim 16, wherein
designating a positive judgement probability as the probability that recognition will be achieved and an output value of 1 thereby produced by a weak classifier, when the weak classifier is applied to an input image which should be recognized as the recognition-objective image,
said class-related classifier group corresponding to a selected class is configured by subtracting, from all of the weak classifiers of said discrimination module, at least a part of those weak classifiers for which respective values of positive judgement probability obtained with respect to images having the secondary features corresponding to said selected class are higher than the values of positive judgement probability which are obtained with respect to images having only said main features.

18. An image recognition apparatus according to claim 17 comprising class updating control module, said class updating control module functioning, when a selected class is found to be different from a class that is specified by said class selection module, to destroy results which have been obtained by calculations applied to the input image that is currently being processed, and to restart the processing of that input image from the beginning.

19. An image recognition apparatus according to claim 17, wherein said image extraction module repetitively performs said partial image extraction, varying said specified size of said extraction window.

20. An image recognition apparatus according to claim 17, wherein said weak classifiers are trained by using a boosting algorithm.

21. An image recognition apparatus according to claim 16 comprising a class updating control module, said class updating control module functioning, when a selected class is found to be different from a class that is specified by said class selection module, to destroy results which have been obtained by calculations applied to the input image that is currently being processed, and to restart the processing of that input image from the beginning.

22. An image recognition apparatus according to claim 21, wherein said image extraction module repetitively performs said partial image extraction, varying said specified size of said extraction window.

23. An image recognition apparatus according to claim 21, wherein said weak classifiers are trained by using a boosting algorithm.

24. An image recognition apparatus according to claim 16, wherein said image extraction module repetitively performs said partial image extraction, varying said specified size of said extraction window.

25. An image recognition apparatus according to claim 24, wherein said weak classifiers are trained by using a boosting algorithm.

26. An image recognition apparatus according to claim 16, wherein said weak classifiers are trained by using a boosting algorithm.

27. An image recognition apparatus according to claim 15, wherein said image extraction module repetitively performs said partial image extraction, varying said specified size of said extraction window.

28. An image recognition apparatus according to claim 15, wherein said weak classifiers are trained by using a boosting algorithm.

* * * * *